(12) United States Patent
Fisher et al.

(10) Patent No.: US 7,403,559 B1
(45) Date of Patent: Jul. 22, 2008

(54) BINARY-VALUED SIGNAL MODULATION COMPRESSION FOR HIGH SPEED CROSS-CORRELATION

(76) Inventors: Benjamin Fisher, 4248 E. Fitzgerald Ave., Orange, CA (US) 92867; Lawrence Weill, 100 Surf Pl., Seal Beach, CA (US) 90740

( * ) Notice: Subject to any disclaimer, the term of this patent is extended or adjusted under 35 U.S.C. 154(b) by 215 days.

(21) Appl. No.: 10/336,103

(22) Filed: Jan. 3, 2003

(51) Int. Cl.
  *H04B 1/00* (2006.01)
(52) U.S. Cl. ..................................... 375/159
(58) Field of Classification Search ............... 375/130, 375/140, 147, 150, 316, 295, 340, 343, 349, 375/354, 362, 367, 371, 373, 376
  See application file for complete search history.

(56) References Cited

U.S. PATENT DOCUMENTS

| | | | | |
|---|---|---|---|---|
| 5,031,191 A | * | 7/1991 | Hiramatsu et al. ........... | 375/130 |
| 6,731,144 B2 | * | 5/2004 | Endo .......................... | 327/151 |
| 6,859,078 B2 | * | 2/2005 | Choi .......................... | 327/149 |
| 7,103,095 B2 | * | 9/2006 | Papasakellariou ........... | 375/150 |

* cited by examiner

Primary Examiner—Khanh C Tran

(57) ABSTRACT

A method of forming a cross-correlation function $$R(\tau) = \sum_{k=N_1}^{N_2} r(k)m(k-\tau),$$

mathematically as an inner product of the samples of a received signal r(t) and a replica of the signal modulation function m(t), with a computational burden reduced by many orders of magnitude in pseudonoise (PN) coded ranging applications is accomplished by a two step process. First, a single weighted sum of the signal samples forms a small dimension vector, of the order of tens of elements. Second, the inner product of this vector and vectors of the same dimension of samples of the signal modulation generating function, delayed by arbitrarily many values of the delay parameter τ, result in fine delay resolution correlation function values. The process comparatively entails a relatively small computational burden, does not compromise fidelity, and makes real-time optimal range estimation practical.

14 Claims, 4 Drawing Sheets

BINARY-VALUED SIGNAL MODULATION COMPRESSION FOR HIGH SPEED CROSS-CORRELATION

BACKGROUND OF THE INVENTION

1. Field of the Invention

The present invention relates to computing the time (in contrast to statistical) cross-correlation function of the output signal of a radio receiver and a replica of the signal evoking that output, in the case where the signal is fixed chipping rate binary-valued carrier modulation.

2. Description of Related Art

A. The Cross-Correlation Function in Radio Ranging Systems

In radio ranging systems, such as radar and GPS (Global Positioning System), detection of signal presence or estimation of signal parameter(s) is optimally based on information provided by the cross-correlation of the signal observed at the radio signal receiver and a replica of the transmitted signal that evoked the signal observed as modified by the transient response of the receiver and the medium through which this signal propagated. For a signal, r(t), observed in the presence of additive white noise, over a time interval $[\bar{t}-T/2, \bar{t}+T/2]$ with mean time $\bar{t}$, its cross-correlation with a replica of the transmitted signal modified by the transient response of both the receiver and the propagation medium and the propagation delay through the propagation medium, commonly assumed in the communications art to be homogeneous and isotropic, after translation to baseband (zero frequency), is the function $$R_{\tau(t)} = \int_{\bar{t}-T/2}^{\bar{t}+T/2} r(t)m(t-\tau(t))e^{-\left(j2\pi\int_{\bar{t}-T/2}^{t} v(u)du + \vartheta(\bar{t}-T/2)\right)} dt. \quad (1)$$

m(t) represents the transmitted signal modulation modified by the propagation medium and the receiver's transient response. τ(t) and v(t), respectively, denote trial functions of the propagation delay and the instantaneous frequency translation (Doppler shift) of the signal carrier. Due to non-translational relative motion of the transmitter and/or the receiver both delay and Doppler shift may be time varying.

B. Envelope Dilation and Doppler Shift

The equation m(t−τ(t)) is the transmitted signal modulation modified by the transient response of the propagation medium and the receiver, stretched or compressed in time, i.e., dilated in the mathematical sense of a change in scale, by the delay function τ(t). If, for example, τ(t) is the constant τ, the dilation factor is unity, i.e., there is no change in time scale. If τ(t) is the function τ't, where τ' denotes the rate of change of delay at the mean time $\bar{t}$, then m(t−τ(t))=m(t−τ't)=m((1−τ')t) and the dilation factor is the quantity 1−τ'. τ' is positive (negative) valued when the range between transmitter and receiver is increasing (decreasing). Events in m(t) occurring at time t instead occur in m((1−τ')t) at the later or earlier time 1/(1−τ') according to the sense (polarity) of τ'. v(t) is the instantaneous frequency shift of the signal carrier related to the delay function τ(t) as follows: v(t)=−$f_c$dτ(t)/dt, where $f_c$ is the frequency of the signal carrier. If τ(t) is the constant τ, then v(t)=−$f_c$d(τ)/dt=0, and there is then no signal carrier Doppler shift. If τ(t)=τ+τ't, then v(t) is the constant Doppler shift v=−$f_c$d(τ+τ't)/dt=−$f_c$τ', and so on, with respect to higher order terms of the delay function.

C. Parameter Estimates/Detection

With respect to estimates of signal parameters, as for instance the signal delay τ($\bar{t}$), it is well known in the art that the time of occurrence of the maximum of the cross-correlation of the observed signal when compensated for carrier Doppler shift, a process described following, and a replica of the transmitted signal, modified by the transient response of the receiver and the propagation medium, that evoked that observed signal is an optimal estimate of signal time-of-arrival when the observed signal is not disturbed by self or external interference. What is meant by optimal in this case is that such time-of-arrival estimate is unbiased and minimum variance. What is meant by self generated interference is that multiple radio signal propagation paths to the receiver antenna, a phenomenon referred to as multipath, are not in evidence. What is meant by externally generated interference is that narrow-band signals not related to the signal modulation, generally externally generated, are not in evidence at the output terminals of the receiver antenna.

In radar systems, the time-of-arrival relative to the time of signal transmission is the delay of the signal in propagating from the transmitter and returning, as an echo, to the receiver from the target, which when normalized by the signal propagation speed constitutes the range from transmitter-to-target-to-receiver. In GPS, the signal time-of-arrival relative to the time the signal was broadcast, normalized by the speed of signal propagation, constitutes an estimate of the range, in GPS referred to as the pseudorange, to the satellite which broadcast that signal.

With respect to signal detection, it is also well known in the art that the value at the maximum of the cross-correlation of the signal observed and the signal replica when the signal is Doppler compensated provides a statistic for optimally deciding that a signal is or is not present.

D. Parameter Estimates with Multipath

In more advanced optimal range estimation systems, particularly when there is present multipath propagation such as occurs when reflected (secondary path) signals are observed along with the direct path signal, optimal estimates of signal delay are based not just on the maximum of the aforementioned cross-correlation, but rather on the complete function. Examples of such advanced optimal range estimation systems are described in U.S. Pat. No. 5,414,729 (1995), U.S. Pat. No. 6,031,881 (2000), and U.S. Pat. No. 6,370,207 (2002). These patents particularly concern processes for the optimal estimation of GPS pseudorange when multipath propagation applies, but also have direct applicability to optimally estimating round-trip delay in radars transmitting binary modulated carriers when multipath propagation applies.

It is feasible to form the signal-replica cross-correlation function by means of a multiplicity of correlators operating in parallel, each with a replica signal at a different predetermined delay to determine the value of the cross-correlation function over the set of delays. This method of forming the cross-correlation function is described U.S. Pat. No. 5,414,729 previously cited. Receivers with correlators operating in parallel are complex and expensive. The invention described herein provides an alternative means of forming the cross-correlation function not requiring parallel operating correlators. This process is simpler, less costly, permits describing this function at arbitrary levels of resolution, and does so without incurring errors that may be evidenced in parallel systems in the case of radio ranging systems which use as the transmitted signal any constant chipping rate binary-valued carrier modulation. This process is also more flexible, requiring only the formation of the correlation function at values of delay dictated by the delay estimation process. With real-time processing systems using parallel correlators, the correlation function must be obtained at all feasible delay values needed in the estimation process prior to its execution, thus incurring an additional mode of computational complexity.

All the various GPS signals broadcast by a given satellite are transmitted through a common antenna matching device referred to as the Triplexer which limits transmission to bandwidths slightly in excess of 24 MHz about the GPS carriers at 1.57542 GHz. (L1 band) and 1.2276 GHz. (L2 band). When received at an Earth based ground station, these signal power levels are nominally of the order of 30 decibels below the internal noise of the receivers requiring signal observations over an interval of the order of one second, or more, corresponding to bandwidth-time (BT) products in excess of 24 million, to provide sufficient energy to enable accurate signal parameter estimates.

A primary attribute common to such radio ranging systems is that the sequence of chips of the modulation waveform is known a priori at the receiver. What is not known is the signal delay, amplitude, carrier phase and Doppler shift, and, if multipath signals are present, these same parameters for the secondary path signal(s); such parameters are the subject of the estimation problem in which the cross-correlation function $R(\tau)$ plays a central role.

E. Examples of Binary-Valued Modulated Signals

In GPS, and often in contemporary radars, the signals broadcast are a pseudo-noise (PN) code sequence modulated carrier. Such signals are binary-valued and are formally referred to as suppressed-carrier phase-shift keyed (PSK) signals. PSK signals broadcast the carrier either in- or out-of-phase with some arbitrary carrier phase, and with PN modulation in a defined structure with elementary intervals of time referred to as chips during which the transmitter broadcasts one or the other carrier phase depending on the chip polarity or a fixed pattern or alternations of carrier phase modulated by chip polarity. PN shift registers with desirable correlation properties use feedback logic configured so that in progressing through a cycle of operation the internal states of the shift register assume all possible states. Shift registers which assume all possible internal states are referred to as maximal length shift registers. The sequence of states of any of the registers, but most commonly the final register, is the PN sequence used to modulate the signal carrier. Because PSK signals are binary-valued, they are broadcast at a constant power output level at one or the other carrier phase. If this level is at the limit of capability of the transmitter, the received signal energy is a maximum in any interval of time. Multi-valued modulation systems will provide a lesser received signal energy. Because of its desirable correlation properties, maximal length PN sequence modulation provides signals of relatively high signal bandwidth which increase with increasing chipping rate. In ranging systems both properties, maximum signal energy and high signal bandwidth, are advantageous.

A notable example of the class of signal modulation described above is provided in the GPS system. The GPS document "Navstar GPS Space Segment Navigation User Interfaces" (ICD-GPS-200) describes a variation of PN binary-valued carrier modulation obtained by logically combining two maximal length shift register outputs to form what is referred to as a manifold of Gold code sequences each sequence unique to each GPS satellite. Gold codes provide relatively low cross-correlation between GPS satellite signals, an important attribute in the GPS system, which cannot be done solely with maximal length PN sequences of a given periodicity. The uniqueness of each Gold code sequence and their low cross-correlation allows for a system with multiple ranging channels all on the same signal carrier frequency and band. In the GPS system there is contemplated the future use of newer binary coded modulation signals. The invention described here is as applicable to these future modulation systems as it is to current modulation systems because all contemplated modulations have low correlation beyond the range of one chip.

In the current GPS system there is specified two chipping rates; one at the rate of 1.023 MHz., which is cyclical with a 1 millisecond period, referred to as the C/A code, and one at a rate ten times greater (10.23 MHz.), also cyclical but with the much greater periodicity of 1 week, referred to as the P(Y) code. Both codes provide means of obtaining accurate ranging information. These codes are broadcast in mutual synchronism. P(Y) code modulation provides somewhat higher ranging accuracy compared to C/A code modulation because of its higher chipping rate. Because of its relatively short cycle time the C/A code is generally more useful in obtaining synchronization of the receiver with the received signal. In the GPS system the PN chipping sequences are modulated with another binary sequence, referred to as NAV (navigation) data, which provides to users satellite almanac and ephemeris information and other information needed to accomplish accurate position determinations from GPS range data. This modulation is at a rate of 50 bps, in synchronism with code modulation, where each message bit spans exactly 20 C/A code cycles.

F. Delay/Doppler Tracking

In the radar or the GPS receiver, the technique commonly employed to find the cross-correlation peak and hence an optimal estimate of signal delay in the absence of multipath uses a delay-lock loop (DLL) to track signal delay in combination with a phase lock loop (PLL) to track signal carrier phase. These loops function in concert. Their operation, which is central to the subject invention, can be most lucidly explained with reference to well known elementary functional elements. In the current art, these functional elements, or others with similar functional intent, are implemented using highly cost effective large scale integrated semiconductor logic which often incur approximations in behavior—not central to the subject matter of this invention.

One variant of the functional elements exemplary of the methodology, shown in FIG. 1, uses the output of a shift register 1, or in the case of GPS a pair of shift registers configured to replicate the transmitted signal Gold code sequence, passed through a filter 3, with the impulse response of the receiver. In sequence, the output signal of this filter is differentiated and correlated 5, with the received signal translated to baseband. If the replica shift register chipping sequence is in time synchronism, i.e., occurring at the same rate and in-phase with the chipping sequence of the received signal, the correlator will evidence a null output. This condition is referred to as delay lock. If the replica chip sequence precesses in phase with respect to the received signal chipping sequence the correlator output will be non-zero, with polarity depending on the relative precession and will display the S-curve behavior typical of that of a discriminator in response to advancing and retarding senses of precession. To establish and maintain delay lock the correlator voltage is amplified, filtered and used to control the frequency output of a voltage controlled oscillator (VCO) 7, serving as the replica shift register clock to advance or retard its phase depending on the discriminator polarity and at a rate depending on the output level of the loop amplifier. If the polarity sense of this output level causes the rate of precession to lessen, the loop will stabilize at the point of operation where the replica shift register chipping sequence is in phase synchronism with that of the received signal. Unless there is a loss of delay lock the chipping sequence will track signal modulation dilation and variations of dilation brought about by variations of propagation delay with a responsiveness depending on the bandwidth of the loop filter.

Delay lock will only apply if the translation frequency of the receiver's final down-converter reference leaves the baseband signal essentially free of carrier phase variations over an interval in time roughly equal to the reciprocal of the delay discriminator filter bandwidth. This is accomplished by a PLL consisting of a phase detector, amplifier, low pass filter, and VCO, which provides the phase detector with its reference signal, in a feedback loop configuration and with input the de-spread received signal. De-spreading operates to strip the received signal of code modulation; the residual being the Doppler shifted signal carrier translated to the receiver's final intermediate frequency. In the case of GPS, the residual signal after de-spreading also evidences the navigation (NAV) message bit modulation superimposed on the code sequence. This will be discussed momentarily. De-spreading is accomplished by modulating the received signal with the replica shift register chipping sequence, and when delay lock applies leaves the residual signal described. The PLL tracks the residual signal carrier in frequency and on the average in phase quadrature to the signal frequency. Its output, shifted in phase by 90°, is used as the reference signal of the receiver's final down-converter to translate the received signal to baseband. In operation, this loop tracks the phase variations of the received signal carrier caused by variations of signal propagation delay or due to other causes, within dynamic limits imposed by the loop's low pass filter bandwidth and receiver noise power relative to carrier power.

In GPS receivers there are additional elements in the carrier phase tracking loop. NAV message bit modulation will prevent the PLL from establishing carrier phase tracking in the GPS receiver. For these receivers a relatively narrow-band bandpass filter with center frequency the receiver's nominal intermediate frequency followed by a squaring function may be inserted between the de-spreader and the PLL phase detector. The squaring operation removes the navigation message modulation but at some sacrifice in increased noise power in the PLL. The band pass filter operates counter to this effect, having the capacity to materially reduce the level of noise presented to the squaring operator. The squaring function also operates to double the frequency of the signal output by the de-spreader, so that in lock the PLL VCO generates twice the receiver intermediate frequency. This is offset by the use of a two-to-one divider function inserted between the VCO and the receiver final downconverter. In the GPS receiver, NAV data modulation will operate to destabilize the delay lock loop when its modulation polarity is negative thereby reversing the sense of the VCO control voltage. The DLL low pass filter is replaced with an "integrate and hold" circuit which delays the application of the VCO control voltage until the message bit polarity is detected. The loop bandwidth is small compared to NAV message bit modulation rate and the effect of this delay is not material on its operation. Detection of message bit polarity is accomplished by a separate circuit in which the de-spread received signal is integrated over the period of time corresponding to a NAV modulation bit, then returned to a null state. This circuit is referred to as an "integrate and dump" circuit. At the terminus of the integration interval, there will be a relatively large positive or negative polarity voltage corresponding to the NAV message bit modulation. If the polarity is negative, the DLL VCO control voltage will be reversed in polarity before application, acting to counter the destabilizing effect described. Subsequent to application of this control voltage the delay lock loop integrator will be returned to a null state ("dumped") in preparation for the next NAV message bit interval. The same process may be used in the PLL loop in place of the previously described squaring and bandpass filtering functions to counter loop destablization there due to the occurrence of negative polarity NAV message bits.

Both the delay loop and phase lock loop VCO's must be externally controllable to accomplish acquisition. Since the delay loop can achieve lock with a baseband signal near, but not exactly at zero residual carrier frequency, acquisition is generally affected by a series of externally controlled trial values of phase loop VCO frequency. At each trial value, the delay loop VCO is varied to allow the reference shift register chipping phase to affect lock. Once delay lock is attained, the PLL then is allowed to come into phase lock, if the trial frequency value is within the pull-in range of the loop. If not, the trial frequency value is slued until phase lock occurs. The evidence for lock on both loops is provided by the message bit detector output voltage level, which presumes NAV message bit synchronization has been accomplished. Since NAV message bits are broadcast in synchronism with code modulation, where each spans exactly 20 C/A code cycles, NAV message bit synchronization is often obtained by detecting the condition that the integrated de-spread signal does not change polarity during intervals of 20 C/A code cycles. This function is incorporated into the acquisition process since for successful operation it requires both delay and Doppler tracking be in effect.

In the current art there are numerous variants to this technique. For example, see chapter 3 paragraph 3.4.5 in "*Global Positioning Systems, Inertial Navigation, and Integration*" authored by M. S. Grewal, et al and published by John Wiley & Sons, Inc. In this chapter, the authors describe a delay loop discriminator affected by means of an "early-late" correlator pair in contrast to the differentiator described above. One distinguishing feature of the technique described above in contrast to the early-late correlator approach is that the early-late correlator will provide only near optimal delay tracking. Another feature of the technique described in the cited reference is the use of squared in-phase and quadrature detected correlation data as inputs to a discriminator delay function in contrast to what is described above. This has certain advantages due to signal phase insensitivity during acquisition, but at the expense of increased sensitivity to receiver noise. With a further variant of the system described above, a frequency lock loop (FLL) is used to accomplish frequency acquisition, and, once this condition occurs, the FLL is replaced with a PLL to bring about carrier phase acquisition to hasten acquisition. All of these variants of technique, and others, may be cited as exemplary of the current art.

Since the phase-tracked received signal at baseband is free of carrier phase variations, i.e., Doppler, accomplished by the means described above, the cross-correlation function is reduced to forming $$R_{\tau(t)} = \int_{\bar{t}-T/2}^{\bar{t}+T/2} r(u)m(u - \tau(u))dt. \tag{2}$$

This is a fundamental reason for the use of the tracking processes described above.

OBJECT AND SUMMARY OF THE INVENTION

One objective of the invention is to reduce the computational burden incurred in computing the received signal cross-correlation with a replica signal in binary-valued carrier modulation systems.

This object is accomplished by means of a signal delay and Doppler shift tracker modified by the first element of the invention to provide signal sampling at a fixed rate relative to signaling chips, independent of signal dilation effects, and by means of a signal sampling compression process, the second and primary element of the invention, which reduces the set of signal samples involved in the aforesaid cross-correlation computations by many orders of magnitude as compared to similar determinations with non-compression methods. The compression process preserves the fidelity of the cross-correlation function determined from it; being equivalent to that provided by non-compressed signal sample means. The compressed signal sample set preserves all the statistical information carried by the signals sample set from which it is derived. This invention makes feasible real-time operation, otherwise not attainable, of advanced range estimators useful in radar and GPS by reducing by many orders of magnitude the computational burden in forming the signal/replica cross-correlation function.

BRIEF DESCRIPTION OF THE DRAWINGS

The invention will be clearly understood, as well as objects and advantages thereof, upon review of the following discussion in conjunction with examination of the following figures and graphs.

DESCRIPTION OF THE PREFERRED EMBODIMENT

The Sampling Element of the Invention

Figure 1:
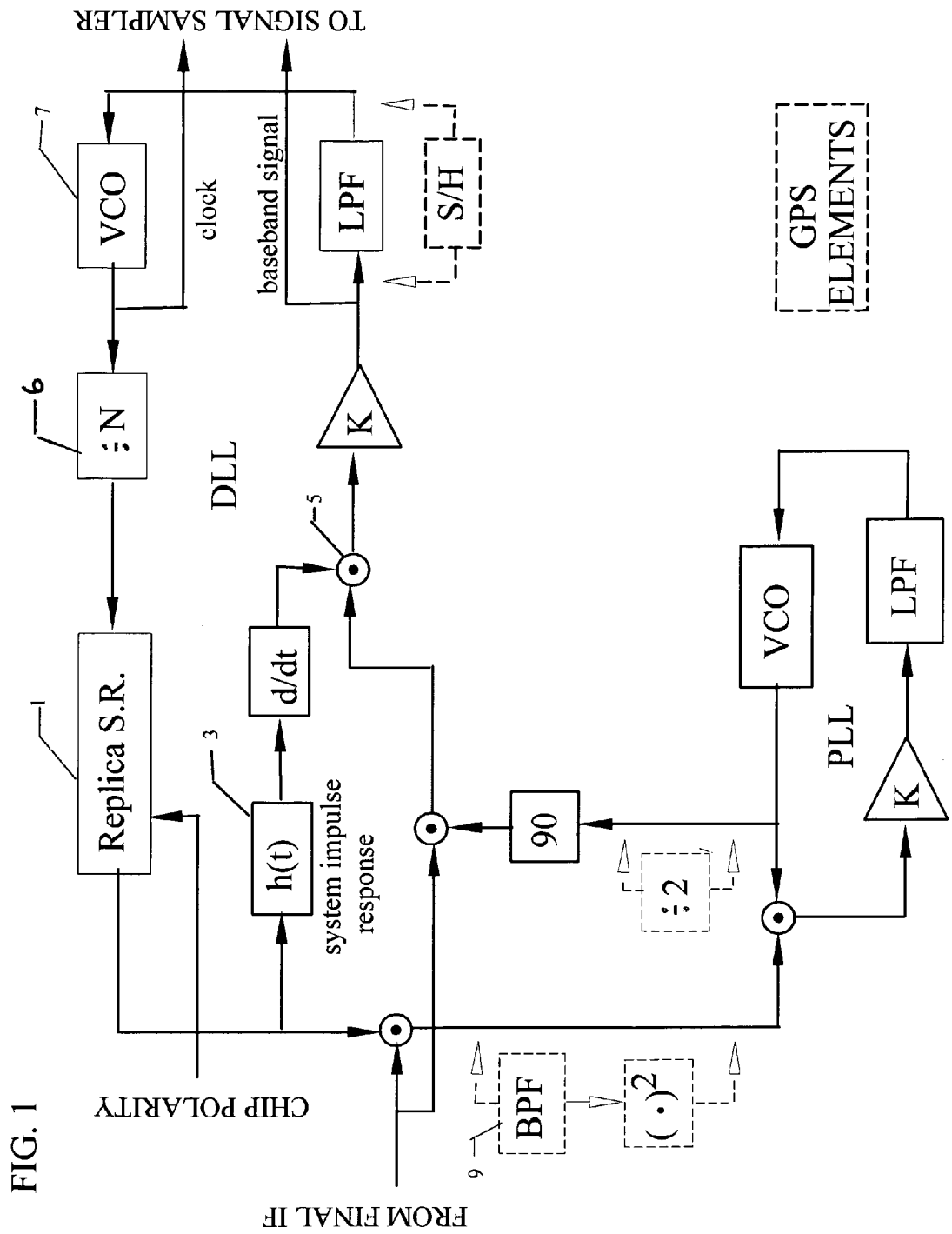
FIG. 1 is a functional block diagram of a delay and phase lock loop signal modulation synchronizer for binary-valued carrier modulation signals showing means to obtain chip synchronous sampling.

More closely related to the subject matter of this invention and not to be found in the current art is the use of a counter 6 in the delay loop juxtaposed between the VCO 7 and the replica shift register 1 as shown in FIG. 1. This counter provides means for sampling the baseband shifted received signal at a desired rate relative to the modulation chipping rate independent of signal modulation dilation effects.

Let N denote the division ratio of this counter 6 and assume N is the desired number of samples per chip, a value set in relation to the signal bandwidth and the chipping rate and must be an integer multiple of the modulation chipping rate. This final requirement is generally satisfied with a sampling rate somewhat in excess of the Nyquist rate when the ratio of signal bandwidth to chipping rate is relatively high. Then in the system of FIG. 1 or with any of its variants, when the divide by N counter 6, is employed the number of samples per chip will be the constant N independent of delay induced signal modulation dilation. The relative phase of this sampling in relation to time of chip occurrences will remain invariant with respect to delay induced signal modulation dilation and further will be in near exact synchronism with the replica shift register 1, since its output clocks the shift register 1.

In contrast, the use of fixed rate sampling, as in the current art, allows deleterious effects due to signal modulation dilation that are difficult to counter and generally cannot be accomplished without measurable adverse effects on performance. Notable among those deleterious effects is the rapid loss of signal processing gain against noise for relatively long signal observation intervals, i.e., for signal observation intervals greater than $1/\tau' f_s$, where $f_s$ denotes the sampling rate of the received signal and, as before, $\tau'$ denotes the rate of change of signal propagation delay at $\bar{t}$. It can be shown that with GPS signals this will limit signal observation times to the order of only tens of milliseconds. Because of the relatively low level of GPS signals observed terrestrially this time interval is inadequate to affect accurate delay estimates. With radar, $\tau'$ will depend on the relative motion of target and receiver. In high dynamic circumstances $\tau'$ induced by signal dilation will also limit signal observation time. In both systems the chip sampling synchronizing process described above will operate to counter time dilation. This feature of the signal sampler is an important element of the subject invention which further operates to materially simplify signal processing associated with the processes described in the subject invention.

With this more advanced method of signal sampling, the problem of forming the signal/modulation cross-correlation function is further reduced to the problem of forming $$R(\tau(\bar{t})) = \int_{\bar{t}-T/2}^{\bar{t}+T/2} r(t)m(t-\tau(\bar{t}))dt. \tag{3}$$

The signals and modulation processes discussed above are continuous in time. For meaningful economic reasons, the current art of radio receiver implementation almost exclusively uses digital logic as compared to analog means to affect implementation. With digital logic implementations, it is necessary to operate on sampled signals, referred to as discrete-in-time, derived from the continuous processes. Let $r(n/f_s)$ and $m(n/f_s)$, respectively, denote the values of $r(t)$ and $m(t)$ at time $n/f_s$. The discrete analog to eq. (3) is the sum $$R(\tau(\bar{t})) = \sum_{n=N_0}^{N_1} r(n/f_s)m(n/f_s - \tau(\bar{t})), \tag{4}$$

where $N_0$ and $N_1$, respectively, denote signal sample index numbers corresponding to the points in time $\bar{t}-T/2$ and $\bar{t}+T/2$. If the rate of sampling is at a rate at least twice the bandwidth of the received signal, after filtering, $R(\tau(\bar{t}))$ given by eq. (4)

supplies all the ranging and other statistical information carried by the sampled signals. The subject of this invention concerns a computationally efficient method of forming the function $R(\tau(\bar{t}))$ of eq. (4) using discrete-in-time signal and modulation sampled data.

The Signal Compression Element of the Invention

In the current art, the signals observed in the receiver for binary-valued carrier modulation ranging systems are commonly sampled either at baseband, or a baseband equivalent, and are sampled at a fixed, predetermined rate accomplished, for example, by the means previously described or by other means equivalent in their operation. Signal sampling is here assumed to occur at a rate commensurate with the signal modulation dilation currently operating. With multi-channel radio ranging systems, e.g., GPS, chip synchronous chip sampling can be accomplished by the means previously described, or by equivalent means, for each channel in parallel-operating implementations.

When multipath propagation applies, there commonly occurs a relatively large error of the signal delay estimate of the delay tracking loop previously described, but most commonly not exceeding a relatively small fraction of the duration of a chip, depending on the relative magnitude and phase of the multipath secondary path signal component(s).

Thus, by the means described assume signal samples are obtained synchronously with chips produced in a binary-valued carrier modulation ranging system at a rate at least twice the one-sided signal bandwidth for bandlimited signals. Then in accord with Shannon's sampling theorem, the signal may be exactly reconstructed from knowledge only of its sample values and therefore these samples are, in a sense, equivalent to the continuous function. To meet the requirements of Shannon's theorem the number of such samples must be at least twice as large as the signal B times T (BT) product which in the applications here contemplated can range to tens of millions. Shannon's theorem does not strictly apply in the case where the signal is both band-limited and time-limited. In that case signal reconstruction is approximate, improving with increasing signal B times T (BT) product, and with errors primarily at the beginning and end of the time limited interval; a factor which does not sensibly effect the attributes of the subject invention.

With sampled signals, the cross-correlation function is formed by summing the product of the Doppler compensated baseband signal samples with corresponding samples of the delayed replica function, the signal modulation, $m(t-\tau)$. Thus, for each value of the delay parameter $\tau$ of $m(t-\tau)$, there will be a number of multiplications and summations proportional to the dimensionality of the set of signal samples. With contemporary digital computational elements, the time to perform these arithmetic operations will, in general, preclude real-time operation of the ranging system.

Satisfying the critical need to reduce the dimensionality of the signal sample set is the main element of this invention and is described by the following process referred to as "signal compression." Signal compression provides means to substantially reduce the dimensionality of sets of signal samples used in forming the correlation function, discussed previously. It accomplishes this by adding signal samples separated by integer values of chip intervals together over the signal observation interval to form a vector of samples of much smaller dimensionality than the signals from which they are derived, while preserving all the ranging and other statistical information carried by the complete set of signal samples observed over the signal observation interval, if, in forming these sums, the following procedure is followed.

The Compression Process

With the signal sampling process, as previously described, sampling occurs synchronously with the receiver generated replica chipping sequence and at a fixed arbitrary rate. Let this rate be denoted by N with units of samples per chip. Let the first signal sample occur at the start of an arbitrarily selected chip in the replica chipping sequence at the start, $\bar{t}-T/2$, of the signal observation interval. For the purpose of signal compression, assign the number zero to this sample and let subsequently occurring samples be sequentially numbered in the order of their occurrence and let those signal samples be denoted by $r(n)$, $n=1,2,3,\ldots$. Let the first chip starting at the sample numbered one be assigned the same number, one. Because of the fixed rate of sampling, subsequently occurring chips will start at a multiple of N samples later, and let those be numbered in sequence. Let also $\xi_k=[-1,+1]$, $k=1,2,\ldots,K$ denote the polarity of these K chips. With this numbering system, the sample numbered KN occurs at the end of the signal observation interval, $\bar{t}+T/2$. The KN signal samples occurring in the interval T are the subject of the compression process. Generally, this will be a large number, of the order of tens of millions. For the moment, assume the compressed signal samples span an interval of M somewhat greater than the interval spanned by N samples. Generally, M will not be a relatively large number, only of the order of perhaps 20 to 30 percent greater than N. Let $\tilde{r}(m)$, $m=1,\ldots,M$ denote the compressed signal sample values. Succinctly stated, the compressed signal samples are formed by taking the sequence of M signal samples starting with the $(kN)^{th}$, $k=1,\ldots,K$ signal sample and adding those values, weighted (multiplied) by the value of $\xi_k$, in numerical order to the correspondingly numbered previously obtained M accumulated values. Multiplication by $\xi_k$ is merely a change in sign if $\xi_k$ is negative. By this process the first set of M values of $\tilde{r}(m)$ are the signal samples $\xi_1 r(m)$, $m=1,\ldots,M$. Following the start of the second chip, the M signal samples, including the starting sample of the second chip, are added element-to-corresponding-element to these where each signal sample is weighted by the second chip polarity, $\xi_2$. Thus, the second set of M values of the compressed signal samples are the quantities $\xi_1 r(m)+\xi_2 r(m+N)$, $m=1,\ldots,M$. At the terminus of the compression process, the M accumulators, $\tilde{r}(m)$, $m=1,\ldots,M$ will be the accumulated values $$\tilde{r}(m) = \sum_{k=1}^{K} \xi_k r(m+kN), m = 1, \ldots, M, \tag{5}$$

referred to as the compressed signal sample set. This compressed signal sample set permits determining the cross-correlation function $R(\tau)$ with a generally much reduced computational burden.

The received signal may lag or lead in time the receiver generated replica code. This comes about particularly in the instance when secondary path signals are in evidence. Their effect is to induce a bias in the DLL discriminator signal operating to control the loop's VCO 7, causing a relative phase displacement of replica code generation timing. This may cause a lead or a lag, depending on secondary path signal phase, in the replica code timing relative to the received signal modulation. In the event that the received signal code modulation leads replica code generation the sample numbering system described above will cause the compressed signal set to evidence truncation and other distortions that will introduce (relatively serious) errors in forming $R(\tau)$. As previously described, between the DLL VCO 7 and the replica code shift register 1 is a counter 6 which divides the VCO signal frequency by N, which is the mechanism for setting the number of samples per signal chip. To avoid the errors incurred due to signal chips leading the replica code sequence this invention introduces a shift register 1 of length L inserted between the DLL VCO 7 and the received signal sampler. Signal samples obtained from the output of this shift register will lead the replica code sequence by L samples, and if L is selected large enough to span extremes of anticipated signal lead, will function counter to the received signal lead, thereby avoiding the truncation and distortion effect described.

Transient effects due to bandlimiting filters incorporated in the receiver's signal processing chain will operate to extend the duration of the receiver's response to the signal modulation chips. This interval of time following the terminus of a chip during which appreciable response is observed is referred to as the decay time. The parameter M discussed above is chosen large enough to span in time both the sampling time displacement (lead) relative to the replica code and the receiver transient decay time. Altogether, this may be a factor of 20% to 30% of the duration of a chip, more or less, depending on pertinent specifics of the signal receiver.

Compression Process Preferred Embodiment

Figure 2:
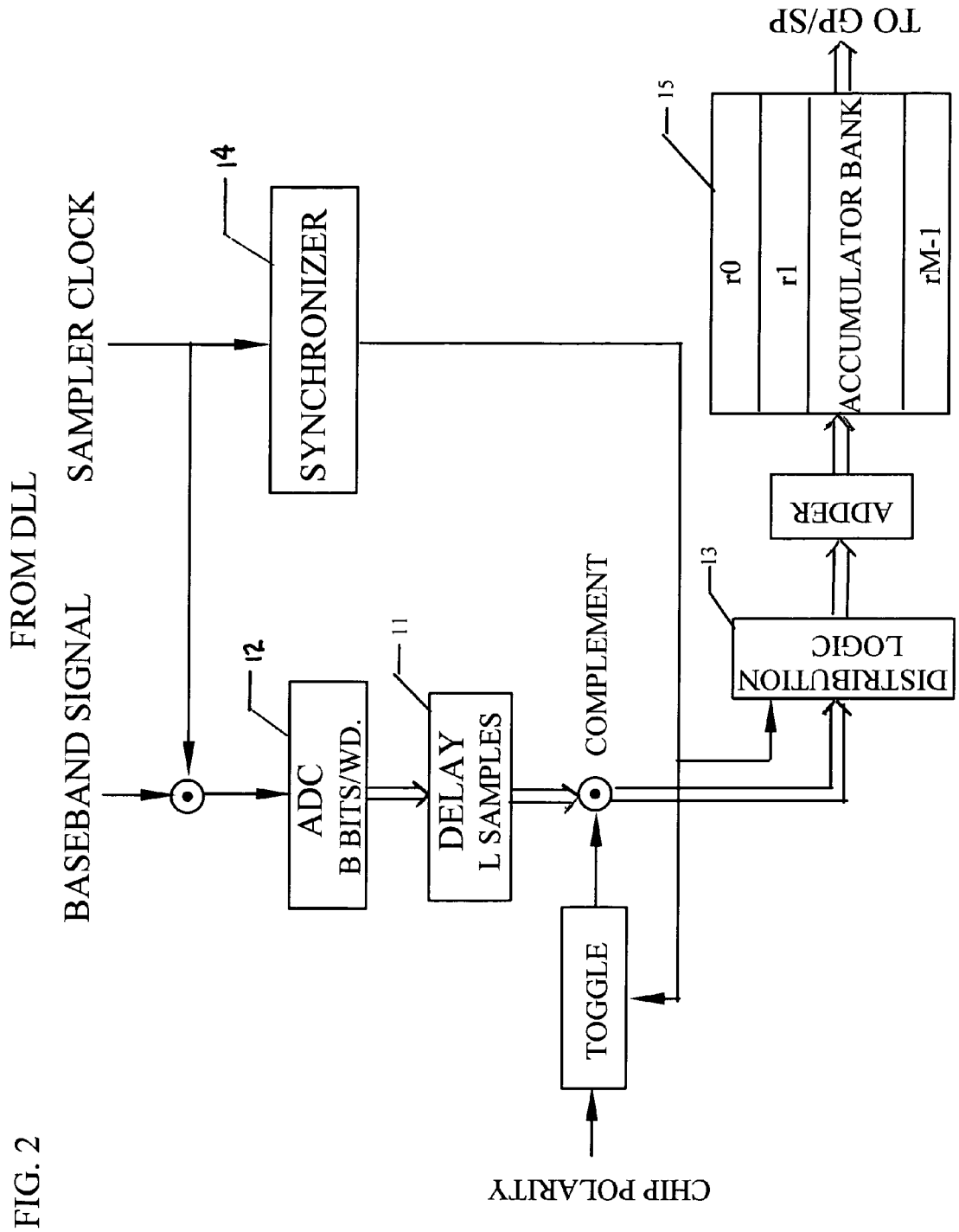
FIG. 2 is a logic flow chart describing means to accomplish signal sample compression.

FIG. 2 shows one variant of the elements needed to affect implementation of this process. If its processing speed is high enough to keep pace with the signal sampling rate, execution in real time of the signal sample compression process, (eq. (5)), can be accomplished by a general purpose (GP) computer. The instructions (software) required for a GP computer to execute eq. (5) can be readily devised by well understood means. In some applications this would be a preferred implementation of the process. In other real-time applications, particularly the ones contemplated here—a radar or GPS signal receiver—dedicated special purpose (SP) Application Specific Integrated Circuit (ASIC) digital logic employing contemporary semiconductor technology is the preferred means of implementation for reasons of economy and speed of execution. Eq. (5) can be executed by various variants of SP digital logic.

In the implementation illustrated in FIG. 2, synchronously with the baseband signal sampler, signal sample values are converted to a sequence of binary based multi-bit digital words, using an analog-to-digital converter (ADC) 12, an element well known in the art. In the least complex case the ADC 12 outputs one-bit words, i.e., the sign of the signal sample. There are systemic reasons having to do with resistance to narrow band interference and enhanced signal processing gain to use higher resolution, multi-bit, words. In the preferred embodiment this is the case. In this embodiment a digital counter 14, modulo M, also a well understood element in the art, is clocked by the signal sampler clock and its count provided as input to a system of logic gates 13, referred to as distribution logic, used to distribute the sequence of ADC outputs to a set of M digital counters 15. These counters accumulate the values of the signal samples modulated by the chip polarity to yield $\tilde{r}(m)$, m=[1]0, M−1 of eq. (5), and may be configured in a number of ways, depending on the application. Where low signal to noise power ratios prevail, as in the applications contemplated here, the frequency of occurrence of logical "ones" and "zeros" for each ADC 12 bit will be very nearly equal. While the occurrence of each over the signal observation interval is typically a relatively large number, their difference is typically relatively small, a few percent of the total number. To limit the dynamic range of the accumulator counters, each is an "up-down" counter, digital elements well known in the art, which tally the difference in the number of logical ones and zeros, bit-by-bit, occurring in each bit of the stream of ADC output words, and where the range of each counter is predetermined in accord with the signal to noise power ratio anticipated. If the ADC outputs are B bit wide words, each accumulator consists of B counters each dedicated to one of the bits of the ADC words.

Asynchronously, the signal sample accumulator counters 15 are interrogated in sequence by a GP computer or SP computational element and converted by the computer or computational element to a number constituting the value of the compressed signal samples by means of the formula $$\tilde{r}(m) = \sum_{b=1}^{B-1} c_m(b) 2^{b-1},$$

where $c_m(b)$ denotes the signed net count (difference between ones and zeros) of the $b^{th}$ (=1, ..., B−1) counter, in bit significance order, of the $m^{th}$ (=0, ..., M−1) accumulator. Access to these counters by the GP computer or SP computational element is provided by a multiplexer, a well known functional element in the art, consisting of a set of gates that propagate the compressed signal sample accumulators' bit counts to the multiplexer output when the input is an interrogation word, the number of the gate, a word generated by the interrogator GP computer or SP computational element, corresponding to the accumulator counter pre-assigned number. Prior to interrogation, the GP computer or SP computational element outputs a command to the various accumulators to halt further signal sample value accumulation until the interrogation process is complete. Following interrogation, the GP computer or SP computational element provides a command to reset each of the accumulator counters to the null state and commence the next observation interval accumulation process.

Distribution of the sequence of ADC outputs to the compressed signal sample accumulators is accomplished by a system of logic gates 13. Upon coincidence with the sample number, generated by the distribution logic and the accumulator number, the ADC output word is propagated to the B bit counters 15 of that number accumulator. Such gate structures are well known in the art. The ADC output words of the M (>N) signal samples following the occurrence of the $k^{th}$ (−1, ..., K) chip generated by the DLL chipping sequence shift register(s) 1 are complemented in polarity, if the polarity of the $k^{th}$ chip, is negative and entered into the M correspondingly numbered accumulators in order of their occurrence. On the occurrence of the $0^{th}$ through $(N-1)^{th}$ sample of the $k^{th}$ group of M compressed signal samples, these sample values are also entered into the contents of the $N^{th}$ through $(M-1)^{th}$ numbered accumulators 15, in sequence, with polarity weighting given by $\xi_{k+1}$, the polarity of the next chip in the sequence occurring at the $N^{th}$ sample of the $k^{th}$ group of M signal samples. This necessitates holding $\xi_k$ for the final M−N signal samples but does not require temporary storage of those words if M is not greater than twice N. This is generally the case. The distribution logic takes the last M−N signal sample ADC words weighted by $\xi_k$, the $k^{th}$ chip polarity, and drives the final M−N accumulators, while, simultaneously those same words, weighted by $\xi_{k+1}$, the $(k+1)^{th}$ chip polarity, drive the first M−N accumulators. If M is greater than 2N, temporary storage of these words is required to accomplish this. These operations and those described above continue iteratively until the end of the $K^{th}$ chip of each signal observation interval to complete the signal sample compression process.

Formation of a High Resolution Receiver Impulse Response Compressed Reference Waveform This compressed received signal vector permits optimally estimating received signal delay, provided that a prestored compressed signal sample vector in high delay resolution and with very low additive noise, sometimes referred to as the replica waveform, is available.

In the preferred embodiment of this invention a commendable replica waveform can be effected using signals normally received or with signals obtained from a signal simulator with signal sampling at a frequency which is a multiple of N per chip selected to accomplish an increase in signal samples density by some multiple, denoted $N_m$. Thus, with signal sampling occurring at a rate equal to $N \times N_m$, signal samples will be $N_m$ times denser than with signal sampling at a rate of N. In combination with an increase in signal observation time to reduce noise on this higher rate signal sample data a replica waveform suitable for use in signal delay optimal, or near optimal, estimation may be accomplished. All this may be affected using the mechanisms displayed in FIGS. 1 and 2 with appropriate changes in parameters.

Referring to FIG. 1 which shows details of a receiver's DLL, assume the frequency division ratio÷N is increased by a factor of $N_m$ causing the signal sampler clock VCO 7 to run at a frequency increased by the factor $N_m$. Assume also, that the delay element 11 shown in FIG. 2 and that the Distribution Logic is capable of routing the $N_m$ higher rate signal sample data to the Accumulator Bank 15, and that this bank of accumulators is increased in dimension by a factor of $N_m$.

As well understood in the art these parameter changes may be affected using SP logic. Such logic implementations can be commanded to operate in alternative modes, i.e., either at the rate N or $N \times N_m$. Thus, when it is desired to effect a replica waveform the circuits described above can be easily adapted accordingly.

Formation of the Cross-Correlation Function

This invention asserts that the compressed signal samples obtained by the process described above when correlated with samples of a single chip displaying the transient response of the signal receiver yields the correlation function $R(\tau)$. Stated algebraically, this invention more specifically asserts that $$R(\tau) = \sum_{m=0}^{M-1} p(m/f_s - \tau) \tilde{r}(m/f_s). \tag{7}$$

$p(m/f_s)$ of this equation is the response of the signal receiver at time $m/f_s$ to a unit amplitude signal modulation chip. $\tilde{r}(m/f_s)$ is the $m^{th}$ sample of the compressed signal sample set. This formula places no restriction on the delay parameter $\tau$, and therefore permits the formation of the cross-correlation function $R(\tau)$ to any desired resolution of the delay parameter.

Computational Burden

Figure 3:
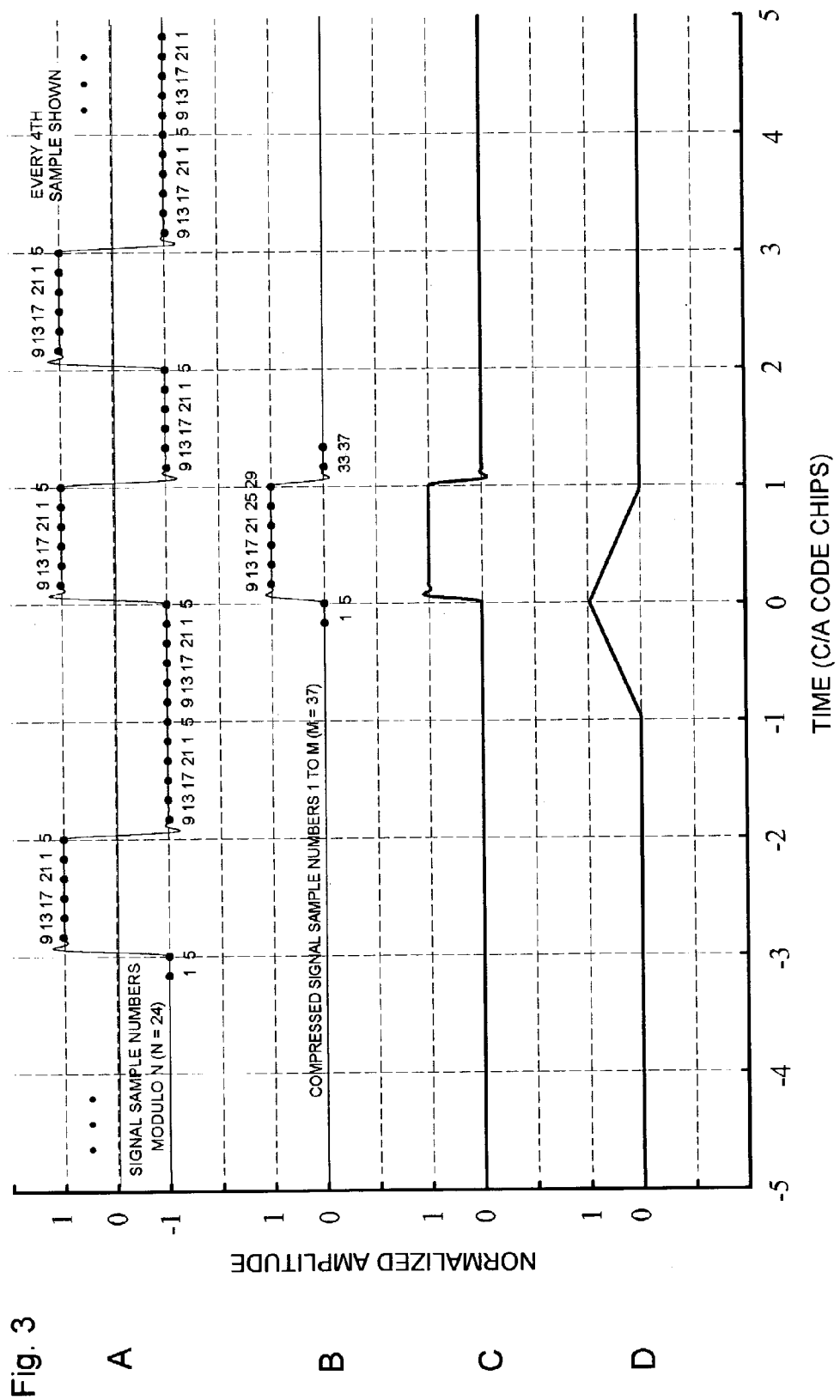
FIG. 3a is a waveform that shows the sample numbering system appropriate to signal sample compression for GPS C/A and Civil L2 code signal modulation.
FIGS. 3b, and c are waveforms that show the compressed signal sample set for C/A and Civil L2 and the high resolution reference waveform used in conjunction with the compressed signal sample set to obtain the high resolution cross-correlation function.
FIG. 3D shows the high resolution GPS C/A code modulation cross-correlation function over the range of plus and minus one chip obtained by correlating the compressed signal sample set of FIG. 4B and the reference waveform of FIG. 4C.

The number of arithmetic operations needed to execute eq. (4), the determination of $R(\tau)$ by application of non-compression means, is KN multiplications and KN–1 additions for each value of the delay parameter $\tau$. For signal observation intervals of one second, the time interval needed to obtain the processing gain commensurate with accurate range determination with GPS signals obtained terrestrially, and with a baseband signal bandwidth of 24 MHz., which fully exploits the GPS transmitted signals, KN is the number 24 million. With C/A code modulation, chipping occurs at the rate of 1.023 chips per microsecond and with a signal bandwidth of 24 MHz. and then with a sampling rate of 24×1.023=24.552 MHz., which is slightly in excess of the Nyquist rate, 24 signal samples will nominally span a chip. Allowing 30% more signal samples to cover decay time and lead or lag uncertainty brings this value up to 31. This is illustrated in FIG. 3*a*. FIGS. 3*b* and 3*c* show the sample numbering schemata for P and L5 Civil, and M code modulations and the corresponding appropriate signal sampling rates to obtain an integer value of samples per chip, a necessary requirement for signal sample compression. For P code modulation, a sampling rate of 3×10.023=30.69 MHz. is required to nominally obtain the integer value of 3 samples per chip, somewhat greater than Nyquist rate for a signal bandwidth of 24 MHz., as is illustrated in FIG. 3*b*. A similar calculation for M and Civil L5 codes gives a sampling rate of 25.575 MHz. for 5 samples per chip. This is illustrated in FIG. 3*c*. Following compression of P code modulation, which is selected as an example, where the number of samples of M=9 are required to span a P code chip, and allowing for appropriate lead or lag and decay times, there will be 9 multiplications and 8 (=M–1) additions required to obtain $R(\tau)$ for each value of the delay parameter $\tau$, a factor somewhat more than $10^6$ smaller than with non-compression means.

Demonstrating Equivalence of the Formation of $R(\tau)$

The signal modulation m(t) observed at receiver baseband is the convolution of the pulse response p(t) with the chip polarity weighted impulse train $$\sum_{k=}^{K} \varepsilon_k \delta(t - kT_c),$$

i.e., $$m(t) = \int_{-\infty}^{\infty} p(x) \sum_{k=0}^{KN} \xi_k \delta(t - x - kT_c) dx, \tag{8}$$

so that $$m(n/f_s) = \sum_{k=0}^{K} \xi_k p(n/f_s - kT_c).$$

Putting that in eq. (4) produces $$R(\tau) = \sum_n r(n/f_s) \sum_{k=0}^{K-1} \xi_k p(n/f_s - \tau - kT_c)$$

and with a change of variables results in $$R(\tau) = \sum_n p(n/f_s - \tau) \sum_{k=0}^{K-1} \xi_k r(n/f_s + kT_c) \text{ but } \tilde{r}(n/f_s) = \sum_{k=0}^{K} \xi_k r(n/f_s + kT_c),$$

is the compressed signal sample set, resulting in eq. (6), thus, illustrating the equivalence of the expressions of eqs. (7) and (4).

Figure 4:
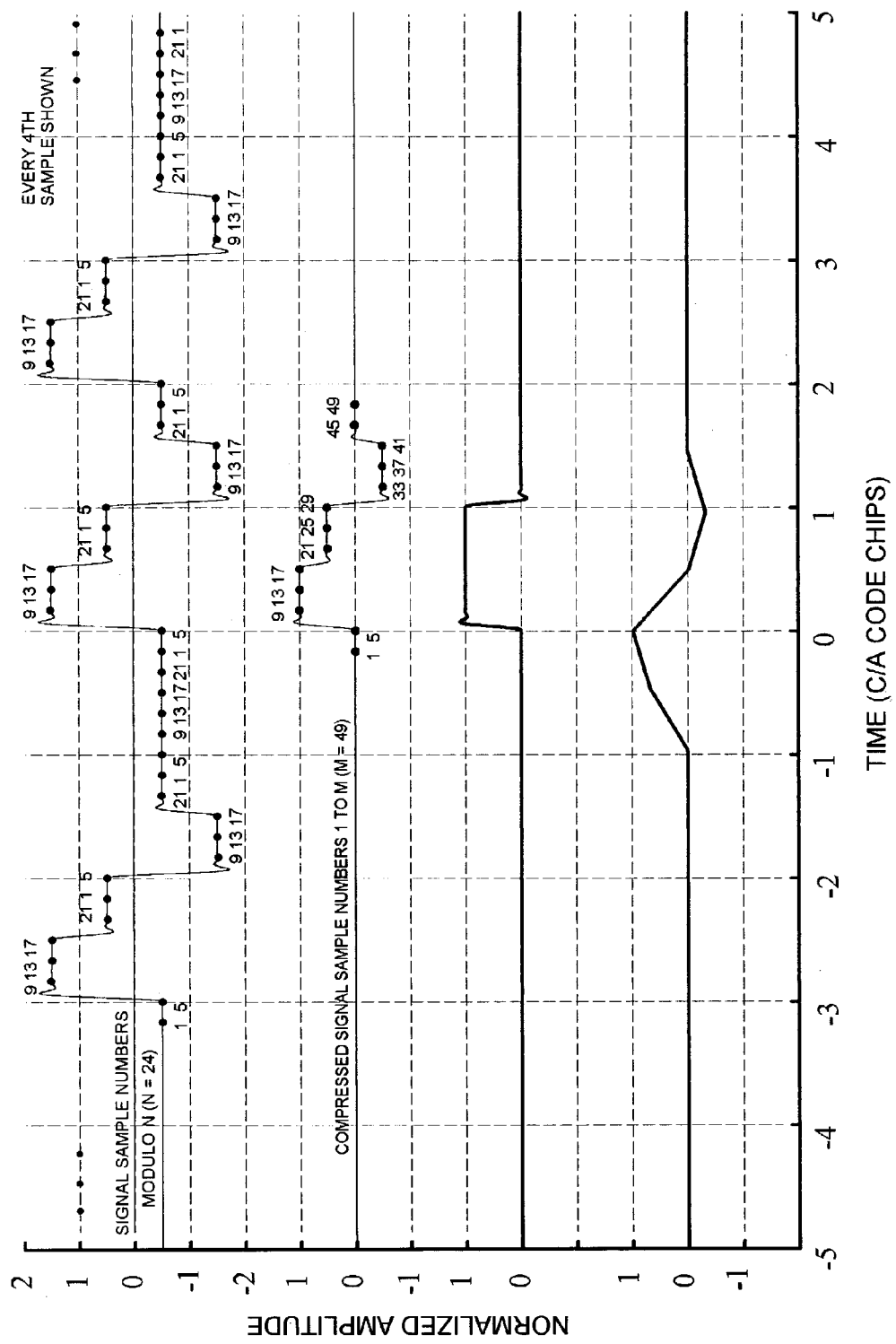
FIGS. 4a, b, c, and d are waveforms that show an example of a) a short duration sampled signal, b) the compressed signal sample set obtained from the signal samples, c) the high resolution reference function used with the compressed signal sample set to obtain the d) signal/reference waveform cross-correlation function.

In the case where multipath is present the range of observed signal samples, M, to be included in the sum for the compressed signal sample set $\tilde{r} \, n/f_s$ of eq. 5 may be selected to span the delay of the multipath signal(s). FIG. 4A illustrates this. In this figure is shown the chipping sequence for GPS C/A code modulation with a ½ (arbitrarily selected) chip delayed, ½ (also arbitrarily selected) amplitude out-of-phase secondary path signal. In this case the range of m will span 1.5 chips plus the number of samples corresponding to the lead desired and the decay time of the receiver response. For this case M has been selected to be 49. FIG. 4B shows the compressed signal set resulting from application of eq. 5. FIG. 4C shows the transient response of a receiver to a single chip, the function p(m) which is the same as that shown in FIG. 3C. FIG. 4D shows the result of correlating p(m) with the compressed signal sample set. This result is easily confirmed by making use of the theorem that correlation functions of sums of signals are the sum of the correlation functions of the individual signals.

We claim:

1. A method of reducing computations in forming a cross-correlation function of samples of a pseudorandom (PN) coded chipping received signal modulation, r(t), observed for an interval of time T at a receiver, and arbitrarily delayed samples of a noise-free receiver generated PN signal replica modulation, m(t), the steps of the method, comprising:
    summation of chip-polarity rectified received signal samples to produce samples of a single PN code modulation chip waveform, or part of a single PN code modulation chip waveform;
    generation of a signal receiver response function, p(t), for a single chip waveform, or part thereof having the transient response of the receiver; and
    cross-correlation of the samples of the single PN code modulation chip waveform, or part thereof, and samples of the signal receiver response function to produce the cross-correlation function.

2. The method of claim 1 in which r(t) is any signal generated for the interval of time T by convolving an elementary monopolar or bipolar waveform, and a bipolar PN coded sequence of impulses.

3. The method of claim 1 in which the summation of the chip-polarity rectified received signal samples is accomplished by multiplying each received signal chip by the polarity of a corresponding chip of the signal replica and summing with previously obtained polarity rectified signal samples at a same relative chip sample index number.

4. The method of claim 1 in which the signal receiver response function, p(t), is a filter response function of a signal transmitter and receiver.

5. The method of claim 1 wherein the summation of chip-polarity rectified received signal samples, provides a set of M compressed signal samples by $$\tilde{r}(m) = \sum_{k=1}^{K} \xi_k r(m+kN), m = 1, \ldots, M$$

where $\xi_k$ denotes the polarity of the k=1, ..., K chips of the signal modulation observed in order of their occurrence and r(n) is the $n^{th}$ n=1, ..., KN sample of observed signal modulation, the manifold of values $\tilde{r}(m)$, m=1, ..., M being a compressed signal set.

6. The method of claim 5 wherein the cross-correlation function is generated according to a computation $$R(\tau) = \sum_{m=0}^{M-1} \tilde{r}(m/f_s) p(m/f_s - \tau),$$

where $\tilde{r}(m/f_s)$ denotes an $\tilde{r}(m/f_s)^{th}$ sample of a compressed signal sample set as computed by the equation of claim 5, and $p(m/f_s-\tau)$ denotes corresponding samples of a reference waveform delayed or advanced arbitrarily by an amount $\tau$, and where for each value $\tau$ a number of multiplications and additions required to compute $R(\tau)$, is typically of an order of tens to hundreds.

7. An apparatus for reducing computations in forming a cross-correlation function of samples of a pseudorandom (PN) coded chipping received signal modulation r(t), observed for an interval of time T at a receiver, and arbitrarily delayed samples of a noise-free receiver generated PN signal modulation, m(t), comprising:
    means for summation of chip-polarity rectified received signal samples to produce samples of a single PN code modulation chip waveform, or part of a single PN code modulation chip waveform;
    means for generation of a signal receiver response function, p(t), for a single chip waveform, or part thereof having the transient response of the receiver; and
    means for cross-correlation of the samples of the single PN code modulation chip waveform, or part thereof, and samples of the signal receiver response function to produce the cross-correlation function.

8. The apparatus of claim 7 in which r(t) is any signal generated for the interval of time T by convolving an elementary monopolar or bipolar waveform, and a bipolar PN coded sequence of impulses.

9. The apparatus of claim 7 in which the summation of chip-polarity rectified PN coded received signal samples is accomplished by multiplying each received signal chip by the polarity of a corresponding chip of the signal replica and summing with previously obtained polarity rectified signal samples at a same relative chip sample index number.

10. The apparatus of claim 7 in which the signal receiver response function p(t), is a filter response function of a signal transmitter and receiver.

11. The apparatus of claim 7 wherein the means for summation of chip-polarity rectified received signal samples, provides a set of M compressed signal samples by $$\tilde{r}(m) = \sum_{k=1}^{K} \xi_k r(m+kN), m = 1, \ldots, M$$

where $\xi_k$ denotes the polarity of the k=1, ..., K chips of the signal modulation observed in order of their occurrence and r(n) is the $n^{th}$ n=1, ..., KN sample of observed signal modulation, the manifold of values $\tilde{r}(m)$, m=1, ..., M being a compressed signal set.

12. The apparatus of claim 11 wherein the cross-correlation function is generated according to a computation $$R(\tau) = \sum_{m=0}^{M-1} \tilde{r}(m/f_s) p(m/f_s - \tau),$$

where $\tilde{r}(m/f_s)$ denotes an $\tilde{r}(m/f_s)^{th}$ sample of a compressed signal sample set as computed by the equation of claim 11, and $p(m/f_s-\tau)$ denotes corresponding samples of a reference waveform delayed or advanced arbitrarily by an amount $\tau$, and where for each value $\tau$ a number of multiplications and additions required to compute $R(\tau)$, is typically an order of tens to hundreds.

13. A method of compressing received signal samples of a pseudorandom (PN) coded chipping signal modulation to a manifold of M samples, comprising:

sampling the chipping signal modulation for an interval of time; and adding an $m^{th}$ m=1, ..., M sample value of the manifold of values, following start of sampling of any given signal modulation chip to a corresponding value of the $m^{th}$ sample of signal modulation chips successively obtained, to obtain a set of values by $$\tilde{r}(m) = \sum_{k=1}^{K} \xi_k r(m+kN), m = 1, \ldots, M,$$

where $\xi_k$ denotes the polarity of the k=1, ..., K chips of the signal modulation observed in order of their occurrence and r(n) is the $n^{th}$ n=1, ..., KN sample of observed signal modulation, the manifold of values $\tilde{r}(m)$, m=1, ..., M being a compressed signal sample set.

14. An apparatus for compressing received signal samples of a pseudorandom (PN) coded chipping signal modulation to a manifold of M samples, comprising:

means for sampling the chipping signal modulation for an interval of time; and means for adding an $m^{th}$ m=1, ..., M sample value of the manifold of values following start of sampling of any given signal modulation chip to a corresponding value of the $m^{th}$ sample of signal modulation chips successively obtained to obtain a set of values by $$\tilde{r}(m) = \sum_{k=1}^{K} \xi_k r(m+kN), m = 1, \ldots, M,$$

where $\xi_k$ denotes the polarity of the k=1, ..., K chips of the signal modulation observed in order of their occurrence and r(n) is the $n^{th}$ n=1, ..., KN sample of observed signal modulation, the manifold of values $\tilde{r}(m)$, m=1, ..., M, being a compressed signal sample set.

* * * * *